US012761633B2

(12) United States Patent
Livesay et al.

(10) Patent No.: US 12,761,633 B2
(45) Date of Patent: Oct. 13, 2026

(54) TOP OF FLUID DETECTION SYSTEM

(71) Applicants: Hecate Software, Inc., Richland, WA (US); Offshore Technical Compliance, LLC (OTC), Covington, LA (US)

(72) Inventors: Eric A. Livesay, Richland, WA (US); Brian LaMarche, Richland, WA (US); Phil Ohl, Richland, WA (US); Harold Kuykendall, II, Covington, LA (US)

(73) Assignees: Hecate Software, Inc., Richland, WA (US); Offshore Technical Compliance, LLC (OTC), Covington, LA (US)

( * ) Notice: Subject to any disclaimer, the term of this patent is extended or adjusted under 35 U.S.C. 154(b) by 501 days.

(21) Appl. No.: 18/167,396

(22) Filed: Feb. 10, 2023

(65) Prior Publication Data

US 2023/0251633 A1 Aug. 10, 2023

Related U.S. Application Data

(60) Provisional application No. 63/308,773, filed on Feb. 10, 2022.

(51) Int. Cl.

| | |
|---|---|
| ***E21B 33/14*** | (2006.01) |
| ***E21B 33/13*** | (2006.01) |
| ***G05B 19/416*** | (2006.01) |
| ***G05D 9/12*** | (2006.01) |

(52) U.S. Cl.
CPC ............ *G05B 19/416* (2013.01); *E21B 33/13* (2013.01); *G05D 9/12* (2013.01); *G05B 2219/37371* (2013.01)

(58) Field of Classification Search
CPC ........ G05B 19/416; G05B 2219/37371; E21B 33/13; E21B 47/005; E21B 33/14; E21B 47/047; E21B 47/06; E21B 33/12; E21B 21/001; E21B 43/129; E21B 33/06;
(Continued)

(56) References Cited

U.S. PATENT DOCUMENTS

| | | | | |
|---|---|---|---|---|
| 2006/0131014 A1* | 6/2006 | Huang | .................... | E21B 47/18 166/250.07 |
| 2017/0241256 A1* | 8/2017 | Erge | ........................ | E21B 33/13 |
| 2018/0010438 A1* | 1/2018 | Ravi | ....................... | E21B 33/14 |

(Continued)

OTHER PUBLICATIONS

SiteCom Well Advisor, Operational Safety, Kongsberg, Retrieved from the Internet: URL: https://www.kongsberg.com/globalassets/digital/oil-and-gas/real-time-drilling/cementing-console.pdf, retrieved on Feb. 10, 2023, (Year: 2016).

*Primary Examiner* — Edwin J Toledo-Duran
(74) *Attorney, Agent, or Firm* — Pillsbury Winthrop Shaw Pittman LLP

(57) ABSTRACT

Provided is a process that includes determining, by a computer system and using a volumetric flow sensor, that a target volume of a fluid has been pumped by a pump through a first leg of a hole system that is representable by a U-tube. The process includes determining, by the computer system and using a pressure sensor at the pump, whether a first pressure reading of the pump is substantially equal to a target pressure. The process further includes notifying, by the computer system and in response to the first pressure reading being substantially equal to the target pressure, that a target top of fluid in a second leg of the hole system has been satisfied.

10 Claims, 9 Drawing Sheets

(58) Field of Classification Search
CPC ...... E21B 21/082; E21B 17/01; E21B 21/067; E21B 33/064; E21B 21/106; G05D 9/12
See application file for complete search history.

(56) References Cited

U.S. PATENT DOCUMENTS

| | | | | |
|---|---|---|---|---|
| 2018/0363414 | A1* | 12/2018 | Bogaerts | E21B 33/14 |
| 2019/0145205 | A1* | 5/2019 | Johnson | E21B 21/001 166/363 |
| 2020/0102817 | A1* | 4/2020 | Couturier | E21B 47/003 |
| 2021/0372094 | A1* | 12/2021 | Al-Muslim | G01N 3/12 |

* cited by examiner

TOP OF FLUID DETECTION SYSTEM

CROSS-REFERENCE TO RELATED APPLICATIONS

This application claims benefit of U.S. Provisional Patent Application 63/308,773, titled "Methods of Determining the Top-Of-Cement (TOC) calculations during a cementing job," filed 10 Feb. 2022. The entire content of the aforementioned patent filing is hereby incorporated by reference.

BACKGROUND

1. Field

The present disclosure generally relates to wellbores penetrating subterranean formations, and more specifically, the present disclosure relates to systems and methods for top-of-fluid detection of fluids in wellbores and other apertures.

2. Description of the Related Art

In the field of oil, gas, and other subterranean drilling exploration, well cementing is typically employed, which is a process of introducing cement to an annular space between a wellbore and a casing. Primary cementing is a critical procedure in the well construction process. The cement sheath provides a hydraulic seal that establishes zonal isolation, preventing fluid communication between producing zones in the borehole and blocking the escape of fluids to the surface. The cement sheath also anchors and supports the casing string and protects the steel casing against corrosion by formation fluids. Failure to achieve these objectives may severely limit the well's ability to reach its full producing potential. Making a determination of the top of the cement (TOC) accurately enough during a casing and cementing job can eliminate the need to perform a possibly very expensive subsequent run of a logging tool following the casing job (i.e., if there is uncertainty in the location of the TOC after the cement job).

SUMMARY

The following is a non-exhaustive listing of some aspects of the present techniques. These and other aspects are described in the following disclosure.

Some aspects include a process including: determining, by a computer system and using a volumetric flow sensor, that a target volume of a fluid has been pumped by a pump through a first leg of a hole system that is representable by a U-tube; determining, by the computer system and using a pressure sensor at the pump, whether a first pressure reading of the pump is substantially equal to a target pressure; and notifying, by the computer system and in response to the first pressure reading being substantially equal to the target pressure, that a target top of fluid in a second leg of the hole system has been satisfied.

Some aspects include a process including: determining, by a computer system and using a volumetric flow sensor, a first change in volume of a fluid that has been pumped over a first time interval by a pump through a first leg of a hole system that is representable by a U-tube; determining, by the computer system and using a pressure sensor at the pump, a first change in pressure at the pump of the fluid over the first time interval; calculating, by the computer system, a top of fluid of a second leg of the hole system based on the first change in volume and the first change in pressure; and providing, by the computer system, the top of fluid calculation of the second leg via a user interface or storing in a top of fluid detection database.

Some aspects include a tangible, non-transitory, machine-readable medium storing instructions that when executed by a data processing apparatus cause the data processing apparatus to perform operations including the above-mentioned processes.

Some aspects include a top of fluid detection pumping system, including: one or more processors; and memory storing instructions that when executed by the processors cause the processors to effectuate operations of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
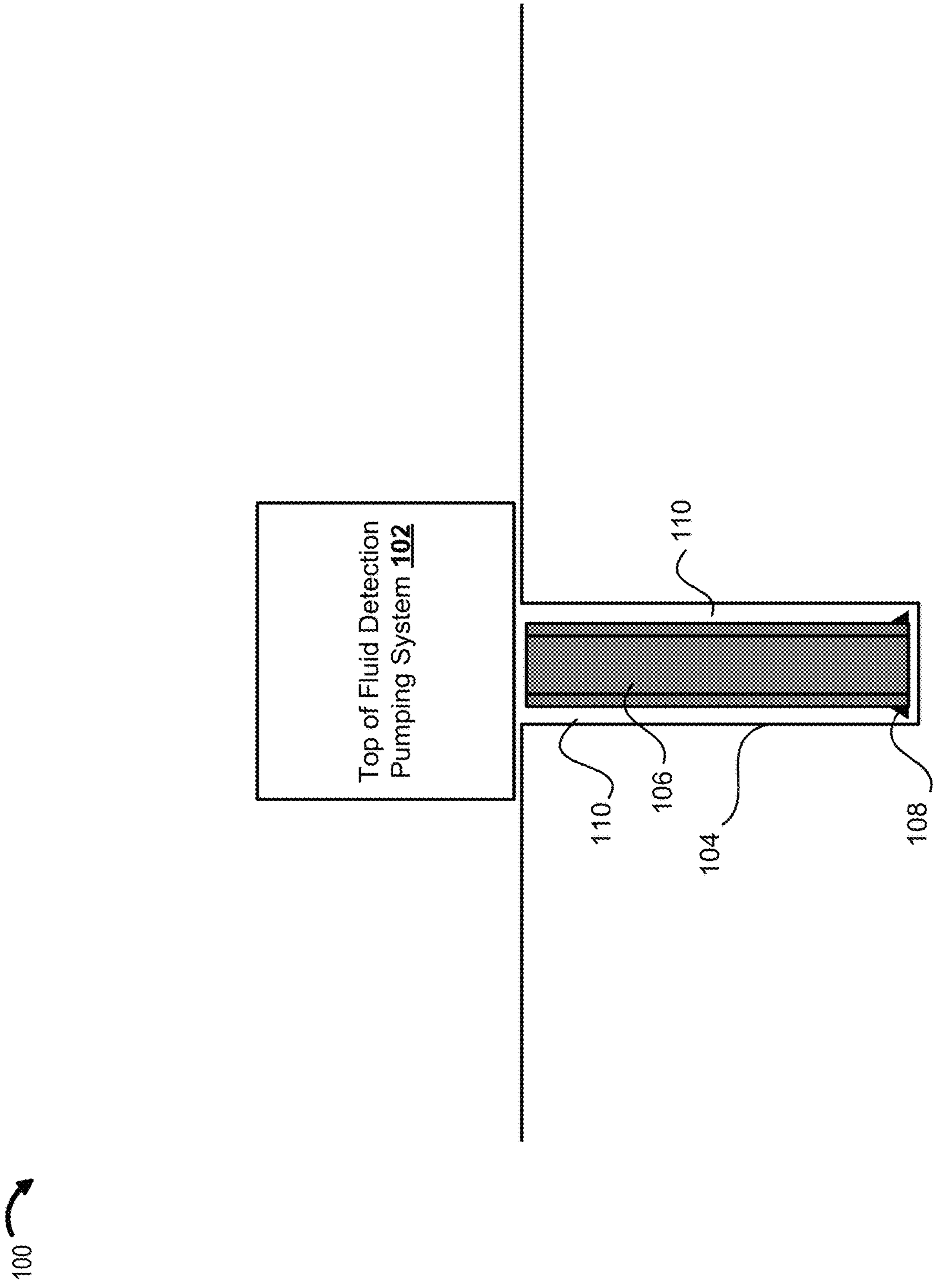
FIG. 1 illustrates a schematic view illustrating an embodiment of a top of fluid detection system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of well drilling and top of fluid detection. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In various embodiments of the present disclosure, systems and methods are disclosed for top of fluid detection in wellbores penetrating subterranean formations. In a specific example, the present disclosure describes a method for determining the location of the top of cement (TOC) during a casing job on an oil and gas rig. Making this determination accurately enough during a casing job can eliminate the need to perform a (possibly very expensive) subsequent run of a logging tool following the casing job (i.e., if there is uncertainty in the location of the TOC after the cement job). The systems and methods described herein are based on real-time measurements of a.) the pressure supplied by the cement unit during the cement job and b.) the corresponding real-time measurements of the volume of fluid—cement and spacer—that are pushed into the casing during the cement job (only pumped volumes appear in the method, flow rate(s) of the pump do not appear explicitly). The method described here treats the casing and wellbore as a U-tube that is filled with incompressible fluids and the technique is adaptable for compressible fluids while still maintaining relevant aspects of the present disclosure. Although the fluids are in motion during a cement job, the method described here models the problem as a succession of hydrostatic equilibrium states. The wellbore diagrams used as examples here are simplistic to demonstrate certain aspects, but the techniques taught herein extend to more complicated designs seen in real world deployments. While examples herein describe the determination of TOC during a casing job on an oil and gas rig, one skill in the art in possession of the present disclosure will recognize that the systems and methods may be used to determine top of other fluids or semi-fluid materials in wellbores or other holes, and thus should not be limited to TOC applications in wellbores.

Referring now to FIG. 1, an embodiment of a top of fluid detection system 100 is illustrated. The top of fluid detection system 100 may include a top of fluid detection pumping system 102. The top of fluid detection pumping system 102 may include one or more pumps and one or more reservoirs that each include a respective fluid (e.g., a spacer material, cement, water, or any other compressible or incompressible fluids that is pumped into a hole such as a wellbore 104 (also referred to as an annulus herein). As discussed below, the top of fluid detection pumping system 102 may include one or more sensors to detect volumetric flow, pressure used to inject the fluid, or any other sensor (e.g., a thermometer, a barometer, or other sensors that would be apparent to one of skill in the art in possession of the present disclosure). The top of fluid detection pumping system 102 may also include a top of fluid detection controller and communication system to detect the top of fluid and report the top of fluid to a user or used to control the flow and pumping of the one or more fluids into the wellbore 104.

The wellbore 104, in oil, gas, or water exploration, may have been formed by a drill. As illustrated, the wellbore is cylindrical in shape but may be of other shapes. Often, during the drilling process, the wellbore 104 may include various washouts such that the cylindrical walls of the wellbore 104 are irregular resulting in the volume of the wellbore 104 not being easily calculated from the surface. When cementing the wellbore 104, these washouts may be greater than anticipated such that not enough cement is delivered to perform the cementing job and the location of the top of the cement is unknown. During a cement and casing job a casing 106 may be inserted into the wellbore 104. The casing 106 may be a steal pipe or another piping material that would be apparent to one of skill in the art in possession of the present disclosure. The casing 106 may be substantially cylindrical forming a hollow tube in the center and may have a wall thickness that takes up volume in the wellbore 104. While the casing 106 is described as a cylindrical tube herein, other shaped casings 106 may be contemplated. A shoe 108 may be coupled to the bottom joint of the casing 106. The shoe 108 may be used to guide the casing 106 into the wellbore 104 or may assist in materials to exit the casing 106 without obstruction. While a simplified casing 106 is illustrated, one of skill in the art in possession of the present disclosure will recognize that the casing 106 may include other components.

When the casing 106 is inserted into the wellbore 104, a space between the casing walls and the wellbore may be referred to herein as an annular leg 110. The annular leg 110 is where the cement will flow up from the bottom of the casing 106 when the cement and spacer are pumped into the casing 106 (e.g., the tube formed by the casing 106) via the top of the casing 106 by the top of fluid detection pumping system 102. While a specific top of fluid detection system 100 has been illustrated, one of skill in the art in possession of the present disclosure will recognize that a top of fluid detection system 100 may include a variety of components, component configurations, or hole configurations for providing the functionality discussed below, while remaining within the scope of the present disclosure as well.

Figure 2:
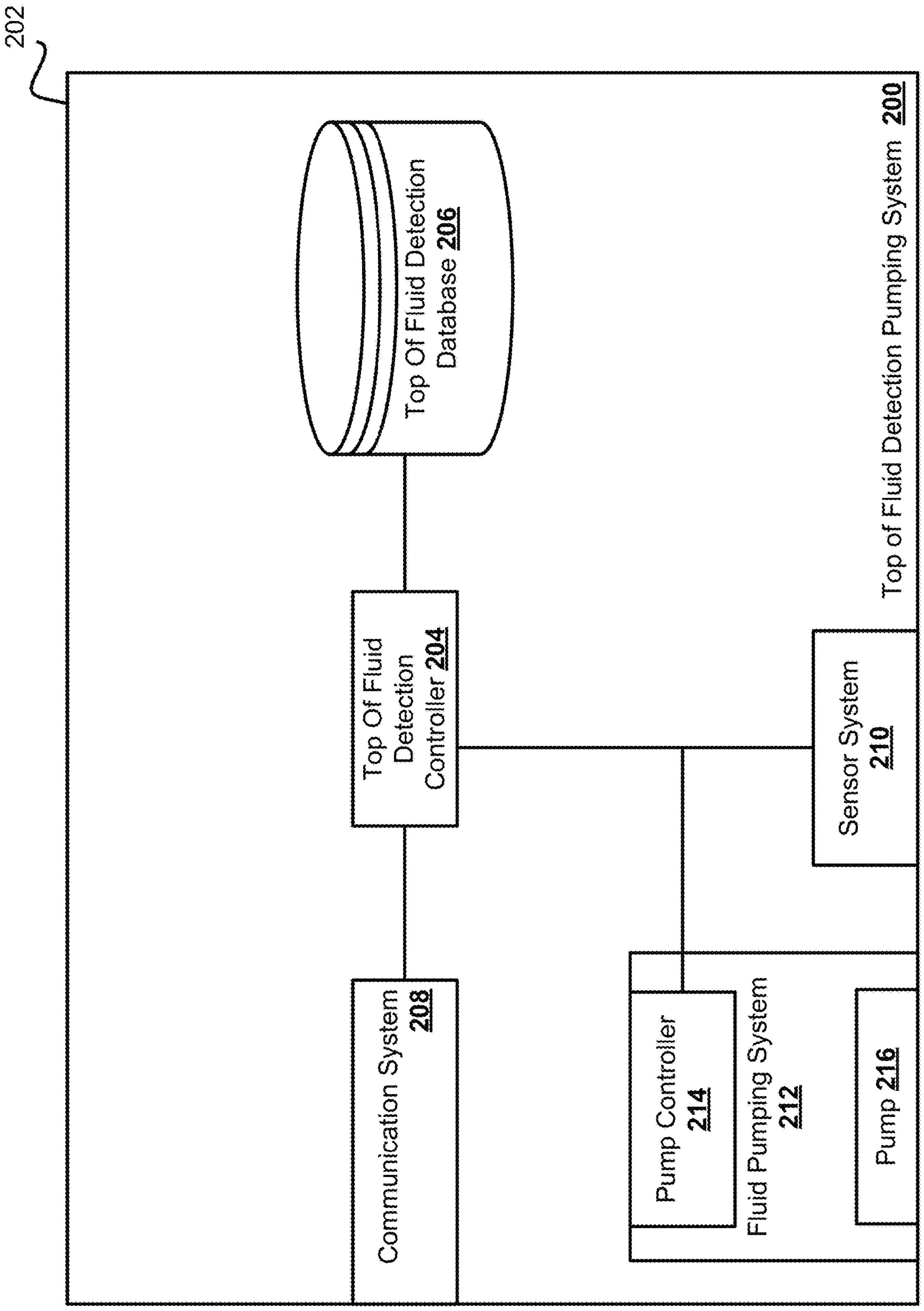
FIG. 2 illustrates a schematic view illustrating an embodiment of a top of fluid detection pumping system, in accordance with some embodiments of the present disclosure.

FIG. 2 illustrates an embodiment of a top of fluid detection pumping system 200 that may be the top of fluid detection pumping system 102 discussed above with reference to FIG. 1. In the illustrated embodiment, the top of fluid detection pumping system 200 may include a chassis 202 that houses the components of the top of fluid detection pumping system 200. Several of these components are illustrated in FIG. 2. For example, the chassis 202 may house a processing system a processing system (not illustrated but may be provided by a processor) and a memory system (not illustrated but may be provided by system memory (e.g., random access memory (RAM) devices such as dynamic RAM (DRAM), synchronous DRAM (SDRAM), solid state memory devices, or a variety of other memory devices known in the art) that is coupled to the processing system and that includes instructions that, when executed by the processing system, cause the processing system to provide a top of fluid detection controller 204 that is configured to perform the functions of a top of fluid detection controller, a top of fluid detection pumping system, or computing devices discussed below.

The chassis 202 may also house a storage system (not illustrated, but which may include mass storage devices that may include hard discs, optical disks, magneto-optical discs, solid-state storage devices, or a variety other mass storage devices known in the art) that is coupled to the top of fluid detection controller 204 (e.g., via a coupling between the storage system and the processing system) and that includes a top of fluid detection database 206 that is configured to store any of the information utilized or generated by the top of fluid detection pumping system 200 and the top of fluid detection controller 204, discussed below. The chassis 202 may also house a communication system 208 that is coupled to the top of fluid detection controller 204 (e.g., via a coupling between the communication system 208 and the processing system) and that may be provided by a Network Interface Controller (NIC), wireless communication systems (e.g., BLUETOOTH®, Near Field Communication (NFC) components, WiFi components, etc.), or any other communication components that would be apparent to one of skill in the art in possession of the present disclosure. In a particular embodiment, the communication system 208 may include a communication interface (e.g., a relatively long-range or relatively high-power transceiver(s)) that is configured to provide communication with networks. For example, the communication interface may be configured to operate according to a satellite communication protocol, a microwave communication protocol, a cellular communication protocol or other protocols that would be apparent to one of skill in the art in possession of the present disclosure.

The chassis 202 may also house or provide the sensor system 210. The sensor system 210 may include one or more sensors. For example, the sensor system 210 may include a geolocation sensor (e.g., a global positioning system (GPS) receiver, a real-time kinematic (RTK) GPS receiver, a differential GPS receiver, a Wi-Fi based positioning system (WPS) receiver, an accelerometer, a gyroscope, a compass, or any other sensor for detecting or calculating orientation, position, or movement), a beacon sensor, ultra-wideband sensors, a camera, a barometric pressure sensor, an inertial measurement unit (e.g., a six axis IMU), a depth sensing camera (for example based upon projected structured light, time-of-flight, a lidar sensor, or other approaches), other imaging sensors (e.g., a three-dimensional image capturing camera, an infrared image capturing camera, an ultraviolet image capturing camera, similar video recorders, or a variety of other image or data capturing devices that may be used to gather visual information from a physical environment surrounding the top of fluid detection pumping system), biometric sensors, an actuator, a fluid pressure sensor, a temperature sensor, a fluid flow rate sensor or other volumetric based sensors, an audio sensor, an anemometer, a chemical sensor (e.g., a carbon monoxide sensor), or any other sensor that would be apparent to one of skill in the art in possession of the present disclosure.

In various embodiments, the chassis 202 houses a fluid pumping system 212. While illustrated as being included in the chassis 202, the fluid pumping system 212 may be a standalone unit that is coupled to the top of fluid detection pumping system 200 via the communication system 208 or that is completely detached such that the sensor system 210 is used to monitor outputs from the fluid pumping system 212 and provide sensor data to the top of fluid detection controller 204 or other configuration that would be apparent to one of skill in the art in possession of the present disclosure. The memory system may include instructions that, when executed by the processing system, cause the processing system to provide a pump controller 214. The pump controller 214 may control a pump 216 to control a flow rate or the pressure of the cement, spacer or other fluids that are being injected into the casing 106 of FIG. 1. While a specific top of fluid detection pumping system 200 has been illustrated, one of skill in the art in possession of the present disclosure will recognize that other top of fluid detection pumping systems (or other devices operating according to the teachings of the present disclosure in a manner similar to that described below for the top of fluid detection system 100) may include a variety of components or component configurations for providing the functionality discussed below, while remaining within the scope of the present disclosure as well.

Figure 3:
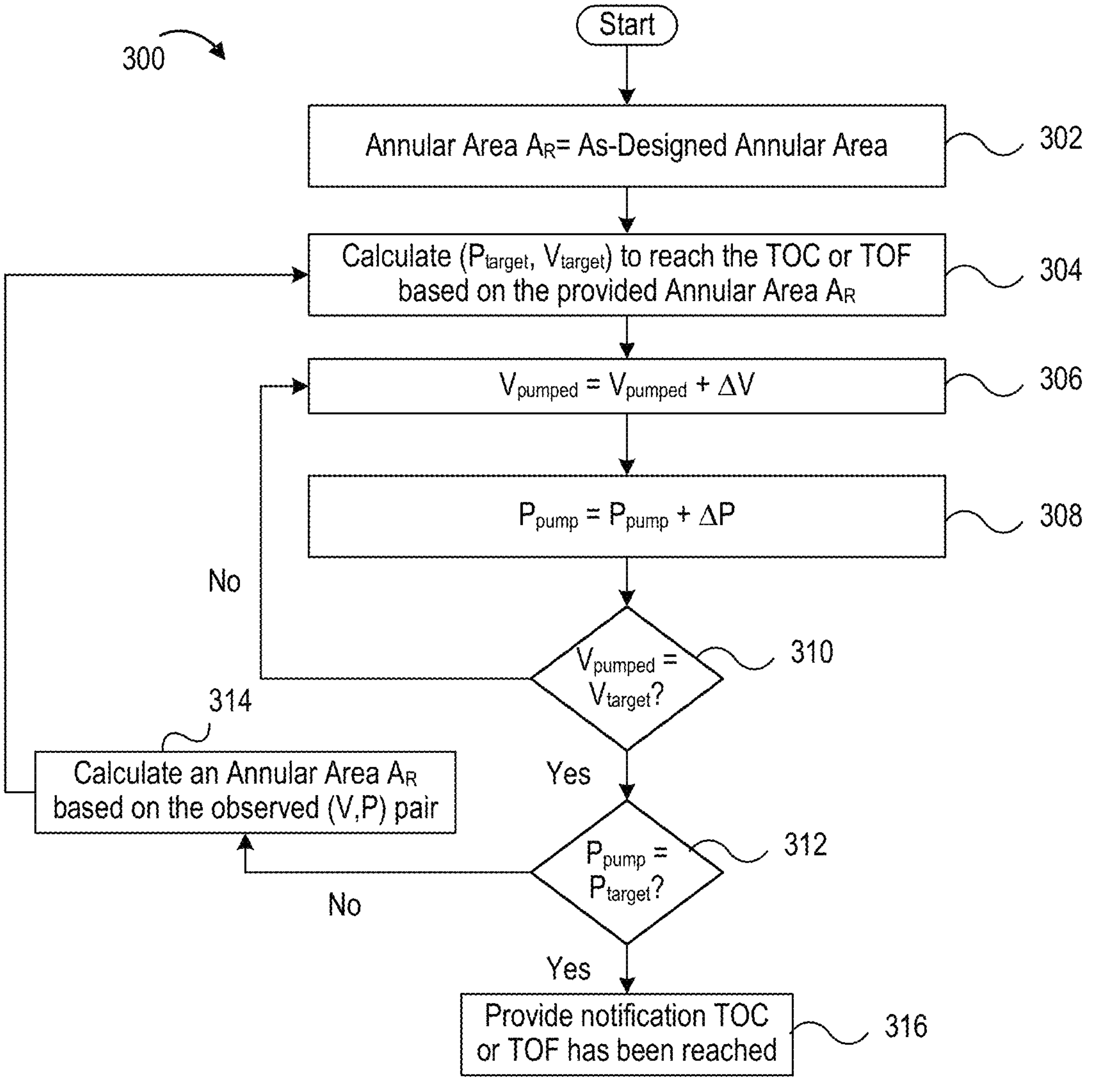
FIG. 3 illustrates a flow diagram showing steps of an example method for top of fluid detection, in accordance with some embodiments of the present disclosure.

Referring now to FIG. 3, a method 300 of top of fluid detection is illustrated. Operations described relative to FIG. 3 may be performed, in various embodiments, by any suitable computer system or combination of computer systems, included in the top of fluid detection system 100 of FIG. 1. Also, operations described below may be discussed relative to the top of fluid detection pumping system 200 of FIG. 2. Further, various elements of operations discussed below may be modified, omitted, or used in a different manner or different order than that indicated.

Figure 4A:
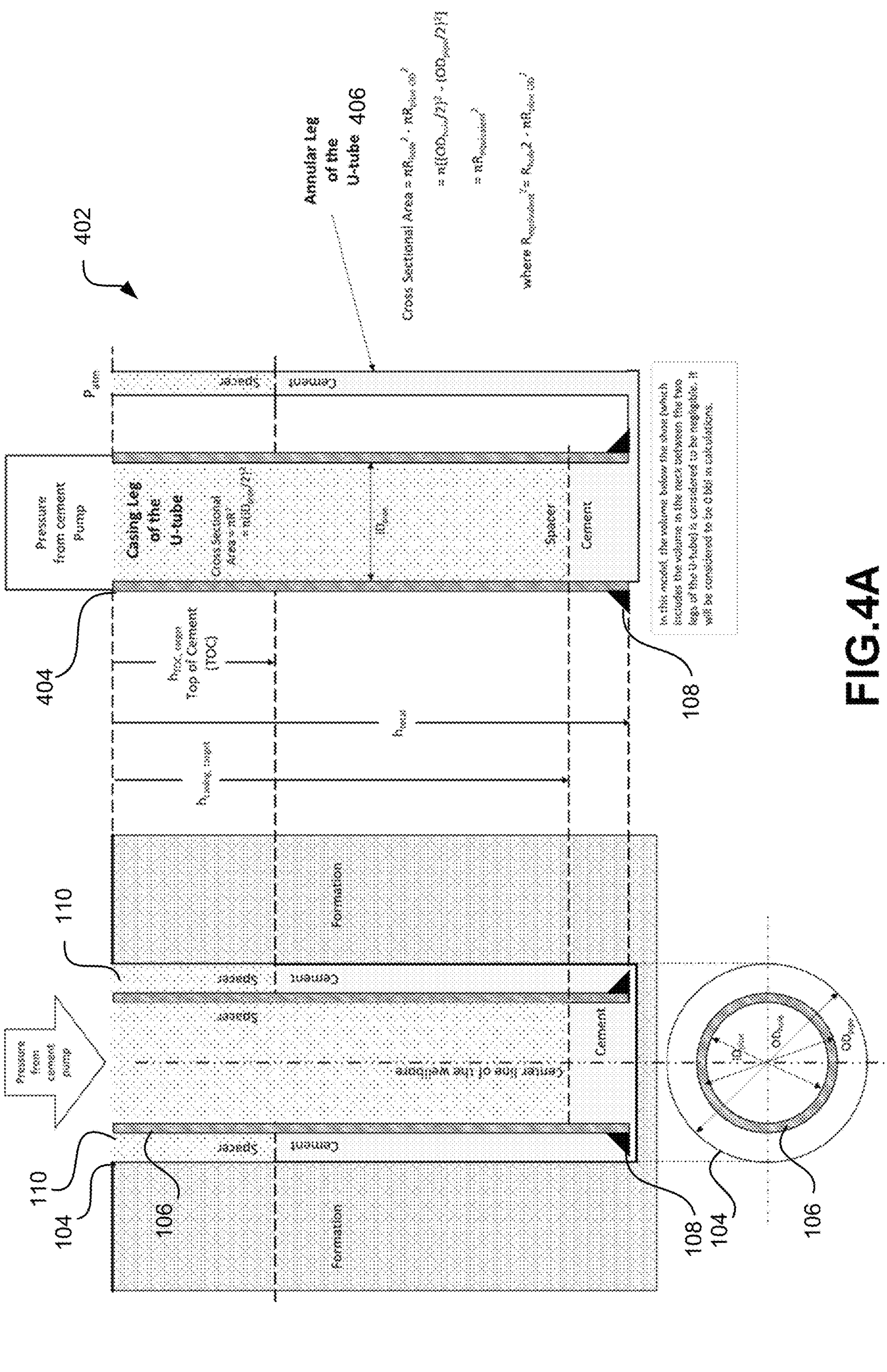
FIG. 4A illustrates the top of fluid detection system from FIG. 1 during the method of FIG. 3, in accordance with some embodiments of the present disclosure.
Figure 4B:
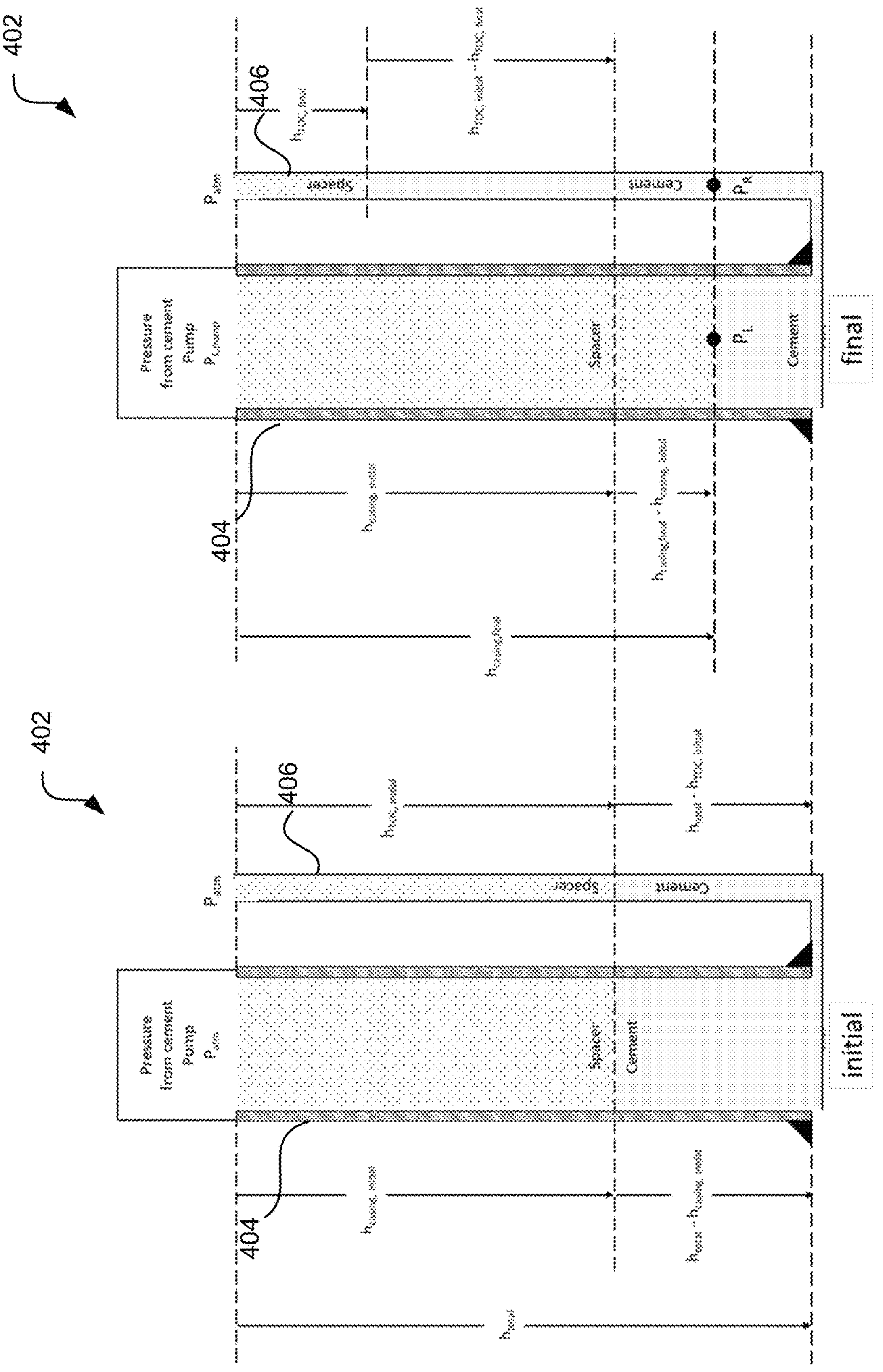
FIG. 4B illustrates the top of fluid detection system from FIG. 1 during the method of FIG. 3, in accordance with some embodiments of the present disclosure.

FIGS. 4A and 4B are referenced in the analysis used in method 300 of FIG. 3 of the present disclosure. As illustrated in FIG. 4A, the wellbore 104 that includes the casing 106 is treated as a U-tube 402 that includes a casing leg 404 an annulus leg 406. To find the volume of cement to be used during the cement job, the height of the target TOC, the final height of the cement in the casing 106 and the total height are used in conjunction with the assumption that the casing 106 is considered to be a perfect tube and the annulus/wellbore 104, which is similarly considered to be perfect and cylindrically symmetric. In practice, additional cement is added to accommodate washout in the wellbore 104. That addition can be considered with certain adjustments. The volume of cement has two contributions (for the calculations here, the volume below the shoe 108 is considered to be 0 bbl.) but in various embodiments may be included in the calculation that follows:

$$V_{cement} = \pi\left(\frac{ID_{pipe}}{2}\right)^2 (h_{total} - h_{casing,target}) + \pi\left[\left(\frac{OD_{hole}}{2}\right)^2 - \left(\frac{OD_{pipe}}{2}\right)^2\right](h_{total} - h_{TOC,target}) \quad \text{Eq 1}$$

The start position for the top of cement (TOC) calculations in this example occurs when the cement is at equilibrium at the bottom of the hole/annulus system as illustrated in the "initial" annulus system of the U-tube 402 in FIG. 4B. Note the exact same spacer sits above the cement found in both the casing leg 404 and the annulus leg 406.

Because the pressure in both legs of the U-tube 402 have the same dependence on height (due to them being filled with the same fluids), $h_{casing,initial} = h_{TOC,initial}$. Utilizing this the top of fluid detection controller 204 may solve for $h_{TOC,initial}$ in terms of $$h_{TOC,initial} = h_{casing,initial} = h_{total} - \frac{V_{cement}}{\pi\left(\frac{ID_{pipe}}{2}\right)^2 + \pi\left[\left(\frac{OD_{hole}}{2}\right)^2 - \left(\frac{OD_{pipe}}{2}\right)^2\right]} \quad \text{Eq 2}$$

The method 300 may include two parts. First, the top of fluid detection controller 204 may determine the volume and pressure that correspond to the cement being pushed-up to the expected TOC location in the annulus leg 406 under the assumption that the annulus leg 406 is perfect e.g., has experienced no washout). Second, once that calculated volume has been pumped, the top of fluid detection controller 204 may evaluate the pressure to see if it is the calculated pressure. If it is, then there is nothing to do, the cement is at the expected TOC location. If it is not, then the top of fluid detection controller 204 may assume that the annulus leg 406 has experienced washout and model that washout as the annulus leg 406 having a different area, albeit a constant area throughout, from top to bottom. Using this new area, the top of fluid detection controller 204 may determine the additional volume of cement that needs to be pumped in order for the cement to reach the target TOC location in the annulus.

Assuming hydrostatic equilibrium where $P_{lower}=P_{higher}+\rho gh$, the pressures identified as $P_L$ and $P_R$ (e.g., pressure in the casing leg 404 (left (L)) and the pressure in the annulus leg 406 (right (R)) of the U-tube 402) of the 'final' image shown on the right in FIG. 4B can be evaluated. The Greek letter "ρ" is the density of the fluids. As such:

$$P_L = P_R \quad \text{Eq 3}$$

$$P_{L,pump} + \rho_{spacer} g(h_{casing,final}) = P_{atm} + \rho_{spacer} g(h_{TOC\ final}) + \rho_{cement} g(h_{TOC,initial} - h_{TOC,final}) + \rho_{cement} g(h_{casing,final} - h_{casing,initial})$$

Noting that:

$$h_{TOC,initial}=h_{casing,initial}$$

these two terms cancel and the above can be written to yield the expected pump pressure when the cement has reached the designed TOC:

$$P_{L,pump}=P_{atm}+(\rho_{cement}-\rho_{spacer})g(h_{casing,final}-h_{TOC\ final}) \quad \text{Eq 4}$$

The term $h_{TOC\ final}$ is a known design parameter. $h_{casing,final}$ can be found from the assumption of an incompressible fluid being moved from the casing leg 404 to the annulus leg 406. That is:

$$V_L = V_R \quad \text{Eq 5}$$

$$A_L(h_{casing,final} - h_{casing,initial}) = A_R(h_{TOC,initial} - h_{TOC,final}) \quad \text{Eq 6}$$

$$h_{casing,final} = h_{casing,initial} + \frac{A_R}{A_L}(h_{TOC,initial} - h_{TOC,final}) \quad \text{Eq 7}$$

With $h_{casing,final}$ known, the volume that will be pumped to get to the expected pump pressure can be calculated. That is:

$$V_L=A_L(h_{casing,final}-h_{casing,initial}) \quad \text{Eq 8}$$

As such, with reference to the method 300 of FIG. 3, at step 302 the annular area in the equations above may be assumed to be the as-designed annular area by the top of fluid detection controller 204. In step 304, the top of fluid detection controller 204 may calculate the target pressure and target volume of the fluid being pumped to reach the top of fluid based on the provided annular area $A_R$. The fluid (e.g., cement and spacer) may be pumped by the fluid pumping system 212 and the sensor system 210 may obtain volume and pressure readings of the fluid being pumped in steps 306 and 308, respectively. In decision step 310, the fluid pumping may continue until the volume pumped equals or substantially equals (e.g., within an acceptable threshold 0.1%, 0.5%, 1%, 2%, or other threshold that would be apparent to a person of skill in the art in possession of the present disclosure) the target volume. The top of fluid detection controller 204 may communicate with the pump controller 214 or the pump controller 214 may determine when to stop the pump 216 from pumping the fluid based on volumetric measurements provided by the sensor system 210. The method 300 may then proceed to decision step 312 where a determination is made as to whether the pressure of the pump 216 equals or substantially equals (e.g., within an acceptable threshold 0.1%, 0.5%, 1%, 2%, or other threshold that would be apparent to a person of skill in the art in possession of the present disclosure) the target pressure. If the pressure of the pump 216 equals or substantially equals the target pressure, then the method 300 may proceed to step 316 where a notification is provided to a user or the any of the top of fluid detection pumping system 200 components that the top of fluid has been reached. For example, a notification may be displayed on a user interface, the notification may be logged in the top of fluid detection database, a notification may be sent out via the communication system 208 to a network, the notification may cause the fluid pumping system 212 or the sensor system to perform an action (e.g., enter a sleep mode, shut down, or any other action that would be apparent to one of skill in the art in possession of the present disclosure). In some embodiment, the notification may include a top of fluid value that was reached.

However, if at decision step 312, the top of fluid detection controller 204 determines that the pressure of the pump 216 does not equal or substantially equal the target pressure, then the method 300 may proceed to step 314, which is described as the second stage of the method 300 above. At step 314, the annular area $A_R$ may be recalculated based on the observed volume and pressure pair.

For example, the pair of values found in Eq 3 and Eq 4—the as-designed volume and pressure—in step 304 above do not account for any washout. They represent the ideal situation of no washout. In reality, some of the pumped volume is expected to go into a void created in the wall of the wellbore 104. The presence of washouts may be determined by comparing the pumped volume to the volume calculated in Eq 3. When that volume has been pumped, compare the pump pressure with the pressure calculated in Eq 4. If the measured pressure is lower than the pressure calculated in Eq 4 then, the top of fluid detection controller 204 may determine what area the annulus leg 406 would need to have in order to satisfy the volume, pressure pair that was measured and then may calculate the volume and pressure needed to reach the desired TOC using the newly calculated annular area $A_R$.

As noted above, the volume that is expected to be pumped according to Eq 4 was in fact pumped but the pressure supplied by the pump 216 to do this was not observed in decision step 312. This is because $h_{TOC,final}$ was not reached. As such, the current value of $h_{TOC}$ may be determined by the top of fluid detection controller 204. This can be found by rearranging Eq 3 to give the actual TOC that was reached by pumping the volume $V_L$.

$$h_{TOC,actual} = h_{casing,final} - \frac{(P_{L,pump} - P_{atm})}{(\rho_{cement} - \rho_{spacer})g}$$

Combining this with Eq 4 and Eq 5 allows a new average area of the annulus leg 406 to be calculated.

$$A'_R = \frac{V_L}{(h_{TOC,initial} - h_{TOC,actual})}$$

Figure 5:
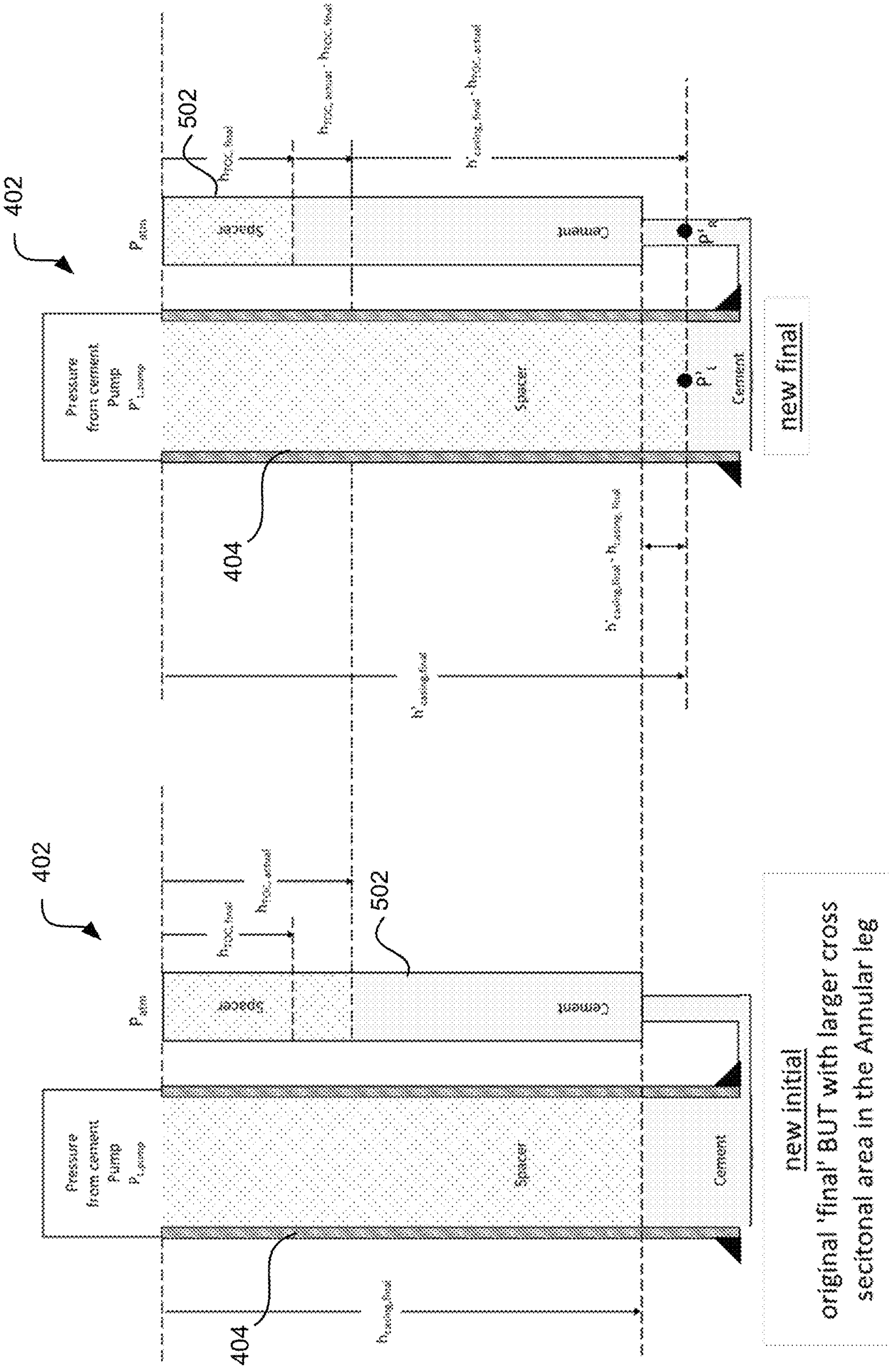
FIG. 5 illustrates the top of fluid detection system from FIG. 1 during the method of FIG. 3, in accordance with some embodiments of the present disclosure.

Rewriting Eq 3 for the values found in FIG. 5 using PL' and PR' as the reference points result in:

$$P'_{L,pump} + \rho_{spacer} g(h'_{casing,final}) = P_{atm} + \rho_{spacer} g(h_{TOC\ final}) + \rho_{cement} g(h_{TOC,actual} - h_{TOC,final}) + \rho_{cement} g(h'_{casing,final} - h_{TOC,actual})$$

This can be re-written as:

$$P'_{L,pump} = P_{atm} + (\rho_{cement} - \rho_{spacer}) g(h'_{casing,final} - h_{TOC\ final}) \quad \text{Eq 9}$$

Again, equating the volume of cement that exited the casing leg 404 with the volume of cement that entered the annulus leg 406 (see Eq 5) results in:

$$h'_{casing,final} = h_{casing,final} + \frac{A'_R}{A_L}(h_{TOC,actual} - h_{TOC,final})$$

And finally:

$$\boxed{V'_L = A_L(h'_{casing,final} - h_{casing,final})} \quad \text{Eq 10}$$

The method 300 may then proceed back to step 304 and continue through steps 306-310. FIG. 5 illustrates the example with discussed above in step 314 where the area of the annulus leg 406 of FIGS. 4A and 4B is recalculated to the area of a new annular leg 502 of FIG. 5.

In certain situations, the method 300 is utilized iteratively. The concept of a single iterative step described above could be extended to any number of iterative steps. Iterative steps could occur every time a known volume, e.g., one barrel of fluid, is pumped. That is, a single iterative step under one technique would consist of a.) assuming the annular geometry (either a 'perfect' annulus or an annulus with a cross-section area that accounts for washout based on the previous iteration's calculations), b.) calculating a (volume, pressure) pair that would be expected to be observed at the pump following pumping of the a known volume down the casing leg, c.) checking whether or not that calculated (volume, pressure) pair is not observed and if not d.) calculating the average cross-sectional area encountered in the annular leg 406 that would lead to the observed (volume, pressure) pair.

Figure 6:
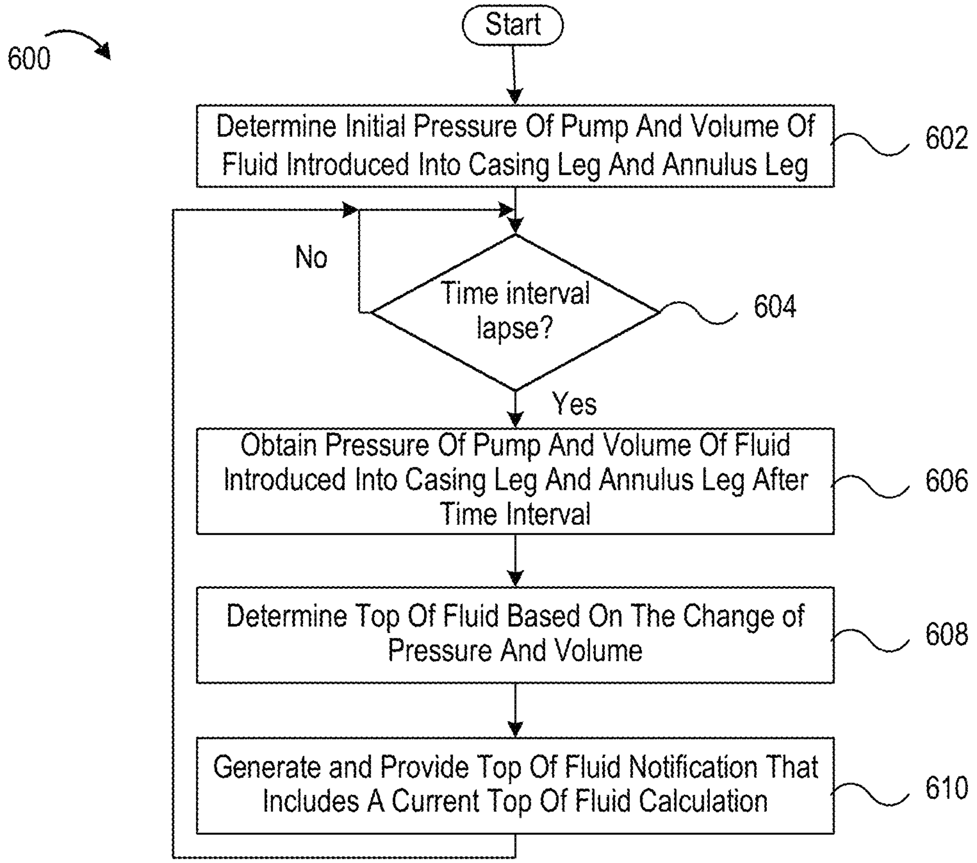
FIG. 6 illustrates a flow diagram showing steps of an example method for top of fluid detection, in accordance with some embodiments of the present disclosure.

FIG. 6 illustrates a flowchart of a method 600 for determining a top of fluid. In method 600, the top of fluid detection controller 204 may assess step changes in the top of fluid which are assessed for every incremental volume and pressure change that are measured at the pump 216 during the cement job. For example, the step changes in the top of fluid may be assessed once-per-second if volume and pressure values are being reported by (or are being collected from) sensor system 210 at the pump 216 once-per-second. However, other time intervals may be contemplate once-per-2 seconds, once-per-30 seconds, once-per-minute, or any other time interval that would be apparent to one of skill in the art in possession of the present disclosure. The method 600 is described herein with reference to FIG. 7 (and assuming that the spacer shown in that FIG. 7 has a density of $\rho_{spacer}=0$), on step (i−1) results in:

$$P_{L,relative\ to\ reference\ line,i-1} = P_{R,relative\ to\ reference\ line,i-1}$$

$$P_{i-1} + 0 = P_{atm} + \rho g(h_{casing,i-1} - h_{TOC,i-1})$$

Similarly, equating pressures relative to the same reference line for step i results in:

$$P_{L,relative\ to\ reference\ line,i} = P_{R,relative\ to\ reference\ line,i}$$

$$P_i + 0 = P_{atm} + \rho g(h_{casing,i} - h_{TOC,i})$$

Taking the difference between these two equations yields:

$$P_i - P_{i-1} = [P_{atm} + \rho g(h_{casing,i} - h_{TOC,i})] - [P_{atm} + \rho g(h_{casing,i-1} - h_{TOC,i-1})]$$

The atmospheric pressure terms on the right-hand-side of this equation drop out and results in:

$$P_i - P_{i-1} = \rho g[(h_{casing,i} - h_{casing,i-1}) - (h_{TOC,i} - h_{TOC,i-1})]$$

Which can be written as:

$$\frac{\Delta P_i}{\rho g} = \Delta h_{casing,i} - \Delta h_{TOC,i} \quad \text{Eq 11}$$

where $$\Delta P_i = P_i - P_{i-1}$$

$$\Delta h_{casing,i} = h_{casing,i} - h_{casing,i-1}$$

$$\Delta h_{TOC,i} = h_{TOC,i} - h_{TOC,i-1}$$

Rearranging Eq 11 and combining it with Eq 2 yields an expression for the top of fluid after any number of steps, N:

$$h_{TOC} = h_{TOC,initial} + \sum_{1}^{N} \Delta h_{TOC,i} \quad \text{Eq 12}$$

$$h_{TOC} = h_{TOC,initial} + \sum_{1}^{N} \Delta h_{casing,i} - \Delta h_{TOC,i}$$

Recall that Eq 8 relates the change in height in the casing leg 404 with the volume of fluid introduced into the casing leg 404.

Figure 7:
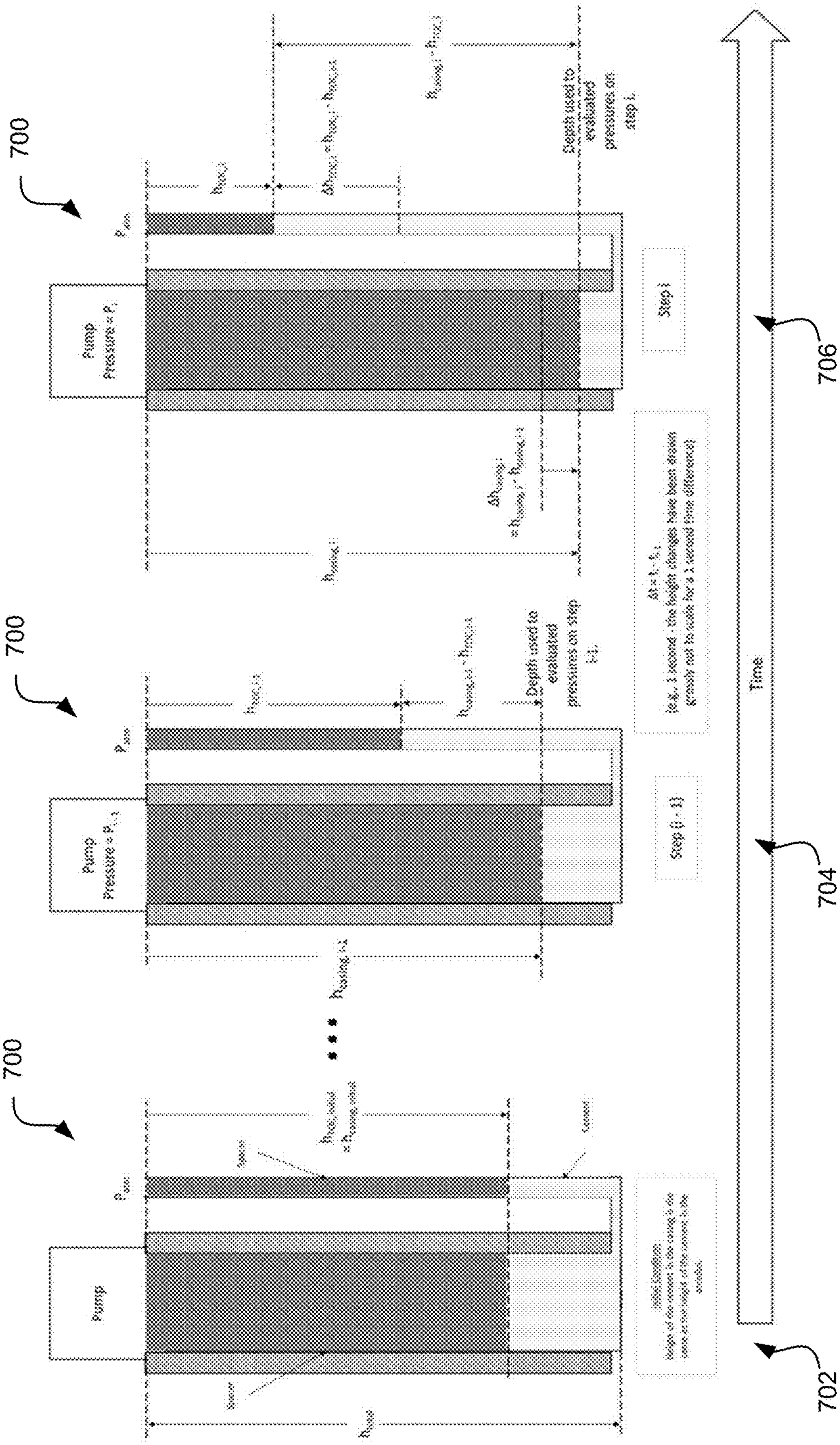
FIG. 7 illustrates the top of fluid detection system from FIG. 1 during the method of FIG. 6, in accordance with some embodiments of the present disclosure.

Thus, the method 600 may begin at step 602 where an initial pressure of the pump 216 and volume of fluid introduced into the casing leg 404 is obtained by the top of fluid detection controller 204 using the sensor system 210. As illustrated, at time 702 of FIG. 7, the top of fluid detection system 700 has an initial pressure and volume. The method 600 may proceed to decision step 604 where it is determined whether a time interval has lapsed. The time interval may have been predetermined (e.g., every second, every two seconds, every 10 seconds, every minute, every 5 minutes or any other predetermined time interval that may be apparent to on of skill in the art in possession of the present disclosure). If the time interval has not been satisfied, the top of fluid detection controller 204 may continue monitoring a clock until the time interval has lapsed, and then proceed to step 606 where pressure of the pump 216 and the volume of fluid introduced after the time interval is obtained. The change in pressure and the change in volume may be used to calculate the top of fluid in the annulus leg 406, in step 608. The method 600 may proceed to step 610 where a top of fluid notification is generated and outputted via a user interface, stored in the top of fluid detection database 206, provided via the communication system 208. The method 600 may return to decision step 604 to determine whether the time interval has lapsed. The method 600 may iteratively determine the top of fluid until the fluid pumping system 212 is deactivated manually or the top of fluid notification causes a condition to be satisfied (e.g., reaching top of fluid target) that causes the user to manually shut down the fluid pumping system 212 or that automatically causes the pump controller to stop pumping or some other sort of action the top of fluid detection pumping system 102/200 that would be apparent to one of skill in the art in possession of the present disclosure. As illustrated in FIG. 7, at time 704, a second top of fluid calculation may be determined after the first time interval. At time 706, a third top of fluid calculation may be determined after a second time interval and so on.

While methods 300 and 600 have been described with certain assumptions of about the fluids, the wellbore 104, the casing 106 and the like, other factors and information may be utilized to more accurately determine the top of fluid. For example, frictional forces based on the casing material, formation material defining the wellbore 104, or fluid(s) being injected into the casing may affect the top of fluid calculations. Furthermore, other geometries of the wellbore 104 and the casing 106 may be considered. For example, often wellbores are curved, and the curvature of those wellbores may contribute to volume and also the flow rate of the fluid. Other factors that may be used in the top of fluid calculations herein may include the compressibility of the fluid being used. Calculations herein assume an incompressible fluid but may be adjusted to factor in the compressibility of the fluid (e.g., concrete, spacer, etc.). While a few other factors are listed herein that may be considered in the top of fluid calculations, other factors or models may be considered when determining a top of fluid based on pressure and volume readings.

The systems and methods described here works with measurements of the correlated pressure data and volume data works with a wide variety of time steps. A range of measurement rates are usable. It is envisioned that that data would be measured 1 time per second but other measurement rates, e.g., 10 times per second, 100 times per second, 1000 times per second or less frequently such as 1 time per 10 seconds, 1 time per 100 seconds or 1 time per 1000 seconds is envisioned. A range of data inputs are usable. Applying the methods described here to raw measurements is envisioned. Additionally, application of the methods described here to raw data that has been fitted in some way, (e.g., to remove the effect of electronic noise in the pressure measurements and/or the volume measurements is contemplated). In various embodiments, a method of filtering the data would be to apply a spline fit to small populations of measured data (e.g., every 10 seconds, every 100 seconds, every 1000 seconds or some other time duration).

The systems and methods of the present disclosure illustrates the basic concepts of the method for calculating the location of the top of cement (TOC) or top of fluid using the simple example of a single piece of casing sitting in an open hole. Although simple, this simple example provides a solution for an actual situation encountered in the field, in particular the introduction of the very first casing into a wellbore. Similar calculations for more complicated geometries are envisioned, e.g., of a liner hanging inside of various pieces of already-introduced-casing. Similarly, practical aspects of actually performing a cement job, e.g., the use of a float collar to ensure cement does not 'flow backwards' through the U-tube, are expected to introduce perturbations to the calculations presented here, not to impact them so drastically as to make them irrelevant.

This implies that in at least some embodiments, implementation of the method described here as computer software would require a user interface that includes a report of a.) the pressure vs. time curve reported by the cement pump or sensor system and b.) functionality for identifying times in that curve between which circulation is underway. Empirical measurement of the pressures between those times could be used for frictional calculations. Functionality to adjust the 'start' and 'end' times of those regions are of obvious benefit.

In various embodiments, the systems and methods provide accurate, correlated measurements of a.) pressure changes at the cement unit and b.) the volume that was pumped due to that pressure change. If volumes reported as being pumped by the cement unit are not accurate enough, the use of an auxiliary highly accurate measurement device for assessing the height of the fluid in the displacement tank is envisioned. Prior calibration of the volume in the displacement tank with height measurements of the top of the fluid by this auxiliary measurement device is envisioned. Regardless of how the volume measurements are made, many aspects of the method outlined here remains unchanged.

Further still, frictional forces exist between the introduced fluids and various surfaces. Tones of primary importance being the inside of the casing, the outside of the casing and the wellbore. These forces depend on several factors including the fluid types (i.e., cement or spacer) and the surface that the fluid is in contact with. The method presented here addresses frictional forces as leading to a constant pressure offset which can be subtracted from the pressures measured during the 'lift' of the cement into the annulus, i.e., during the most critical part of the cementing job with regards to identifying the top of cement. Various embodiments are imagined for addressing friction in this way including a.) calculating the overall frictional force based on knowledge of the casing (geometry and material properties) and wellbore (geometry and geological information) and/or b.) measuring the frictional force while circulating spacer through the wellbore, i.e., immediately prior to introduction of the cement Thus, systems and methods of the present disclosure provide top of fluid detection. By monitoring pressure of the pump and fluid flow to determine a volume of fluid injected into an annulus system that can be represented by a U-tube, a top of fluid can be determined in the annulus leg of the U-tube when fluid (e.g., concrete or spacer) is injected into the casing leg of the U-tube. Furthermore, the top of fluid determination may be used to determine a more accurate area of the annulus/wellbore to account for washouts and other irregularities in the wellbore. As such, real-time determination of top of fluid may be determined such that costly probing techniques and delays are avoided when the cementing process does not result in cement coming out of the top of the annulus leg. Such delays, especially when the top of cement is determined to be inadequate may result in costly repairs to the casing and cementing process.

Figure 8:
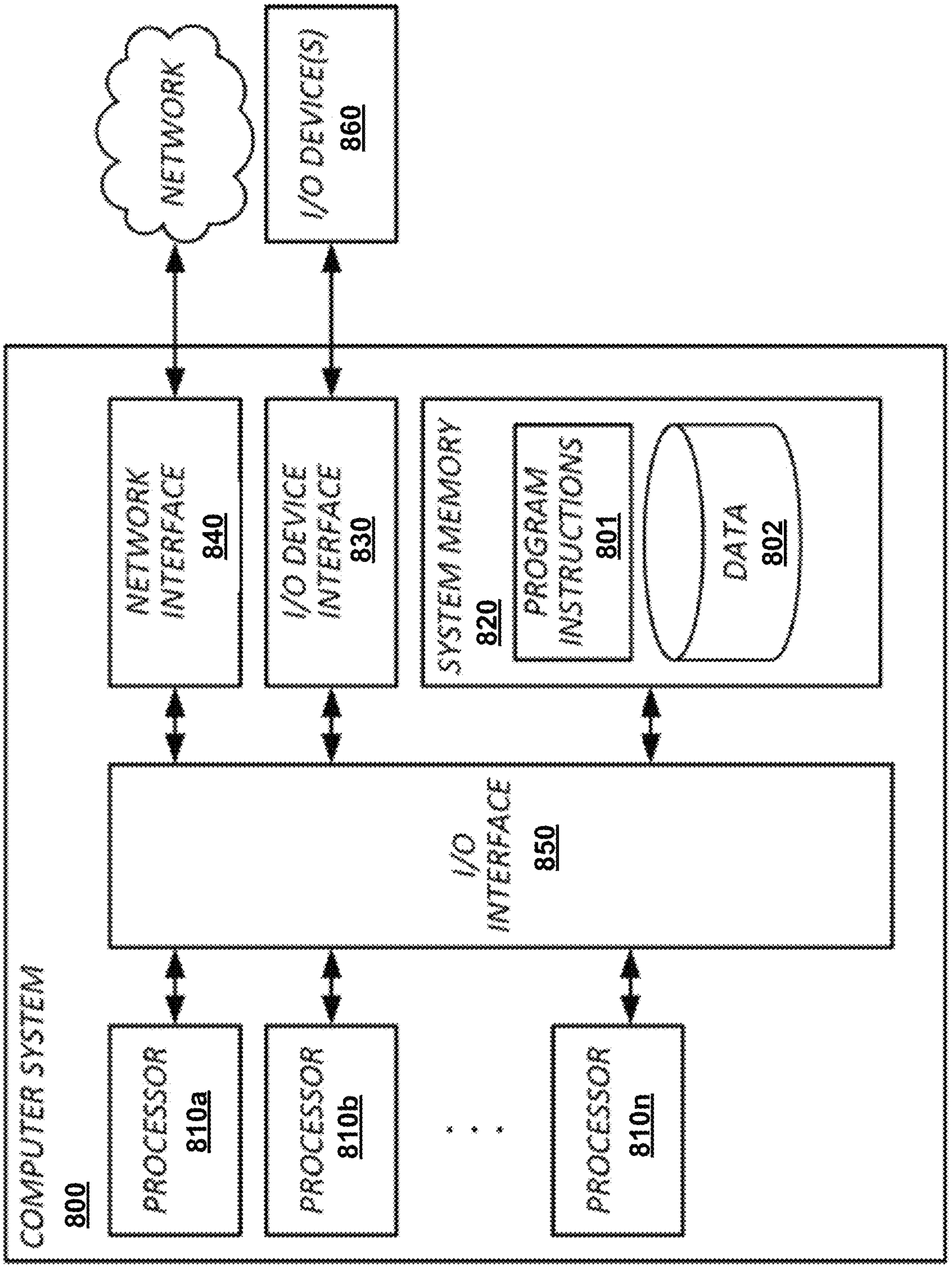
FIG. 8 shows an example of a computing device by which the present techniques may be implemented, in accordance with some embodiments.

FIG. 8 is a diagram that illustrates an exemplary computing system 800 in accordance with embodiments of the present technique. Various portions of systems and methods described herein, may include or be executed on one or more computer systems similar to computing system 800. For example, the top of fluid detection pumping system 102/200 may include the computing system 800. Further, processes and modules described herein may be executed by one or more processing systems similar to that of computing system 800.

Computing system 800 may include one or more processors (e.g., processors 810*a*-810*n*) coupled to system memory 820, an input/output I/O device interface 830, and a network interface 840 via an input/output (I/O) interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a uni-processor system including one processor (e.g., processor 810*a*), or a multi-processor system including any number of suitable processors (e.g., 810*a*-810*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 800 may include a plurality of computing devices (e.g., distributed computer systems) to implement various processing functions.

I/O device interface 830 may provide an interface for connection of one or more I/O devices 860 to computer system 800. I/O devices may include devices that receive input (e.g., from a user) or output information (e.g., to a user). I/O devices 860 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computer system 800 through a wired or wireless connection. I/O devices 860 may be connected to computer system 800 from a remote location. I/O devices 860 located on remote computer system, for example, may be connected to computer system 800 via a network and network interface 840.

Network interface 840 may include a network adapter that provides for connection of computer system 800 to a network. Network interface 840 may facilitate data exchange between computer system 800 and other devices connected to the network. Network interface 840 may support wired or wireless communication. The network may include an electronic communication network, such as the Internet, a local area network (LAN), a wide area network (WAN), a cellular communications network, or the like.

System memory 820 may be configured to store program instructions 801 or data 802. Program instructions 801 may be executable by a processor (e.g., one or more of processors 810*a*-810*n*) to implement one or more embodiments of the present techniques. Instructions 801 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 820 may include a non-transitory computer readable storage medium that may have program instructions stored thereon that are executable by a computer processor (e.g., one or more of processors 810*a*-810*n*) to cause the subject matter and the functional operations described herein. A memory (e.g., system memory 820) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 850 may be configured to coordinate I/O traffic between processors 810*a*-810*n*, system memory 820, network interface 840, I/O devices 860, and/or other peripheral devices. I/O interface 850 may perform protocol, timing, or other data transformations to convert data signals from one component (e.g., system memory 820) into a format suitable for use by another component (e.g., processors 810*a*-810*n*). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 800 or multiple computer systems 800 configured to host different portions or instances of embodiments. Multiple computer systems 800 may provide for parallel or sequential processing/execution of one or more portions of the techniques described herein.

Those skilled in the art will appreciate that computer system 800 is merely illustrative and is not intended to limit the scope of the techniques described herein. Computer system 800 may include any combination of devices or software that may perform or otherwise provide for the performance of the techniques described herein. For example, computer system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: determining, by a computer system and using a volumetric flow sensor, that a target volume of a fluid has been pumped by a pump through a first leg of a hole system that is representable by a U-tube; determining, by the computer system and using a pressure sensor at the pump, whether a first pressure reading of the pump is substantially equal to a target pressure; and notifying, by the computer system and in response to the first pressure reading being substantially equal to the target pressure, that a target top of fluid in a second leg of the hole system has been satisfied.
2. The medium of embodiment 1, wherein the operations further comprise: determining, by the computer system and in response to the first pressure reading not being substantially equal to the target pressure, a current top of fluid of the fluid in the second leg based on the target volume and the first pressure reading; calculating, by the computer system, an updated annular area of the second leg based on the current top of fluid; and calculating, by the computer system, an updated target pressure and an updated target volume based on the updated annular area.
3. The medium of embodiment 2, wherein the operations further comprise: causing, by the computer system, the pump to pump additional fluid through the first leg of the hole system until the updated target volume is satisfied.
4. The medium of any one of embodiments 1-3, wherein the fluid includes concrete.
5. The medium of any one of embodiments 1-3, wherein the first leg of the hole system includes a volume defined by a casing.
6. The medium of embodiment 5, wherein the second leg of the hole system includes a casing volume defined by a space between the casing and a wall of the hole system.
7. The medium of any one of embodiments 1-6, wherein the operations further comprise: calculating an as-designed annular area used to determine the target volume and the target pressure.

8. A non-transitory, machine-readable medium storing instructions that, when executed by one or more processors, effectuate operations comprising: determining, by a computer system and using a volumetric flow sensor, a first volume change of a fluid that has been pumped over a first time interval by a pump through a first leg of a hole system that is representable by a U-tube; determining, by the computer system and using a pressure sensor at the pump, a first pressure change at the pump of the fluid over the first time interval; calculating, by the computer system, a top of fluid of a second leg of the hole system based on the first volume change and the first pressure change; and providing, by the computer system, the top of fluid calculation of the second leg via a user interface or storing the top of fluid calculation in a top of fluid detection database.

9. The medium of embodiment 8, wherein the operations further comprise: determining, by the computer system and using the volumetric flow sensor, a second volume change of the fluid that has been pumped over a second time interval, subsequent to the first time interval, by the pump through the first leg of the hole system that is representable by the U-tube; determining, by the computer system and using the pressure sensor at the pump, a second pressure change at the pump of the fluid over the second time interval; calculating, by the computer system, a subsequent top of fluid of the second leg of the hole system based on the second volume change and the second pressure change; and providing, by the computer system, the subsequent top of fluid calculation of the second leg via the user interface or storing the subsequent top of fluid calculation in the top of fluid detection database.

10. The medium of any one of embodiments 8-9, wherein the fluid includes concrete.

11. The medium of embodiment 10, wherein the fluid includes spacer material.

12. The medium of any one of embodiments 8-11, wherein the first leg of the hole system includes a volume defined by a casing.

13. The medium of embodiment 12, wherein the second leg of the hole system includes a volume defined by a space between the casing and a wall of the hole system.

14. A method including any of the operations of embodiments 1-7 or including any of the operation of embodiments 8-13.

15. A top of fluid detection pumping system, including: one or more processors; and memory storing instructions that when executed by the processors cause the processors to effectuate any of the operations of embodiments 1-7 or embodiments 8-13.

What is claimed is:

1. A non-transitory, machine-readable medium storing instructions that, when executed by one or more processors, effectuate operations comprising:

determining, by a computer system and using a volumetric flow sensor, that a target volume of a fluid has been pumped by a pump through a first leg of a hole system that is representable by a U-tube, wherein the fluid includes concrete;

determining, by the computer system and using a pressure sensor at the pump, whether a first pressure reading of the pump is substantially equal to a target pressure;

determining, by the computer system and in response to the first pressure reading not being substantially equal to the target pressure, a current top of fluid of the fluid in a second leg of the hole system based on the target volume and the first pressure reading;

calculating, by the computer system, an updated annular area of the second leg based on the current top of fluid;

calculating, by the computer system, an updated target pressure and an updated target volume based on the updated annular area; and notifying, by the computer system and in response to a second pressure reading being substantially equal to the updated target pressure, that a target top of fluid in the second leg has been satisfied.

2. The medium of claim 1, wherein the operations further comprise:

causing, by the computer system, the pump to pump additional fluid through the first leg of the hole system until the updated target volume is satisfied.

3. The medium of claim 1, wherein the first leg of the hole system includes a volume defined by a casing.

4. The medium of claim 3, wherein the second leg of the hole system includes a casing volume defined by a space between the casing and a wall of the hole system.

5. The medium of claim 1, wherein the operations further comprise:

calculating an as-designed annular area used to determine the target volume and the target pressure.

6. A method comprising:

determining, by a computer system and using a volumetric flow sensor, that a target volume of a fluid has been pumped by a pump through a first leg of a hole system that is representable by a U-tube, wherein the fluid includes concrete;

determining, by the computer system and using a pressure sensor at the pump, whether a first pressure reading of the pump is substantially equal to a target pressure;

determining, by the computer system and in response to the first pressure reading not being substantially equal to the target pressure, a current top of fluid of the fluid in a second leg of the hole system based on the target volume and the first pressure reading;

calculating, by the computer system, an updated annular area of the second leg based on the current top of fluid;

calculating, by the computer system, an updated target pressure and an updated target volume based on the updated annular area; and notifying, by the computer system and in response to a second pressure reading being substantially equal to the updated target pressure, that a target top of fluid in the second leg has been satisfied.

7. The method of claim 6, further comprising:

causing, by the computer system, the pump to pump additional fluid through the first leg of the hole system until the updated target volume is satisfied.

8. The method of claim 6, wherein the first leg of the hole system includes a volume defined by a casing.

9. The method of claim 8, wherein the second leg of the hole system includes a volume defined by space between the casing and a wall of the hole system.

10. The method of claim 6, further comprising:

calculating an as-designed annular area used to determine the target volume and the target pressure.

* * * * *